[11] 3,594,532

[72] Inventors  Frank W. Lunau
　　　　　　　　Kingston;
　　　　　　　　Keith B. Weatherald, Reigate, both of,
　　　　　　　　England
[21] Appl. No.  787,711
[22] Filed  Dec. 30, 1968
[45] Patented  July 20, 1971
[73] Assignee  The British Oxygen Company Limited
　　　　　　　　London, England
[32] Priority  Jan. 8, 1968
[33]  Great Britain
[31]  1101/68

[54] HEATING APPARATUS
　　　3 Claims, 2 Drawing Figs.
[52] U.S. Cl. .......................................... 219/121 L,
　　　　　　　　　　　　　　　　　　　　　　　350/285
[51] Int. Cl. .................................................. B23k 27/00
[50] Field of Search ............................... 219/121 L,
　　　121 R, 121; 350/285, 6, 7

[56]  References Cited
　　　　　UNITED STATES PATENTS
3,154,371  10/1964  Johnson .......................  219/121 L
3,388,314  6/1968  Gould.............................  219/121 L
2,692,370  10/1954  Moore, Jr. ....................  350/7
3,343,451  9/1967  Durocher.......................  350/6
3,516,743  6/1970  Mckown et al. ..............  350/6

OTHER REFERENCES
" Optical Amplifier" G. L. Parkes, IBM TECHNICAL DISCLOSURE BULLETIN, Vol. 4, No. 4, Sept. 1961

*Primary Examiner*—J. V. Truhe
*Assistant Examiner*—Hugh D. Jaeger
*Attorney*—Townshend & Meserole ABSTRACT: Apparatus for heating a workpiece by a radiant energy beam utilizing two mirrors to direct the beam. The first mirror which intercepts the beam from its source is rotatably mounted on a fixed support, and the second mirror is rotatably mounted and is controlled by an electrical system. The second mirror intercepts the beam from the first mirror and transmits the beam to the workpiece.

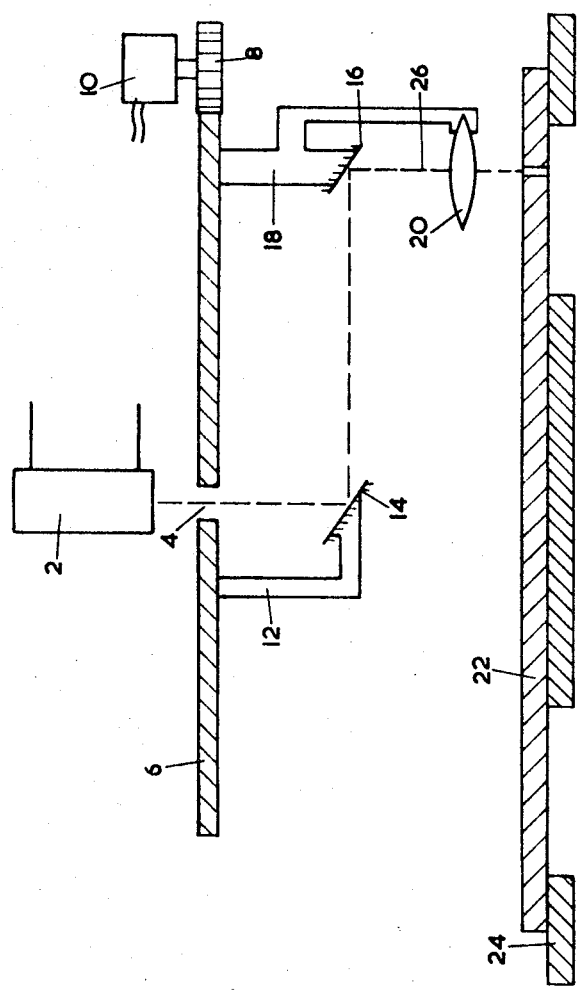

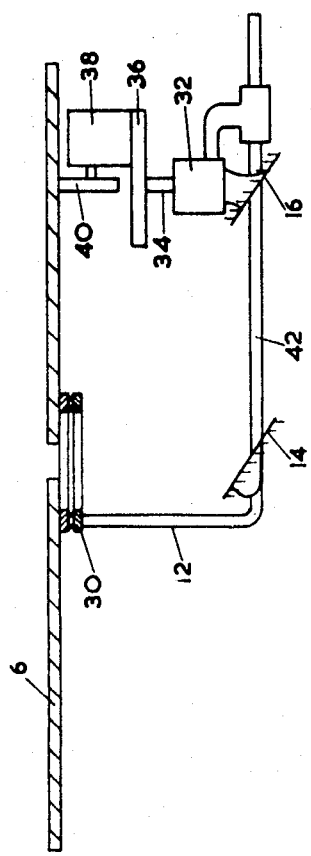

HEATING APPARATUS

This invention relates to heating apparatus, particularly for selectively heating a workpiece or workpieces along a curved or closed path.

The degree of heating is controlled so that two workpieces may be fusion-welded together, or a single workpiece may be cut by fusion of the workpiece, along a desired path. Although both welding and cutting are embraced by the term "heating," in view of the main intended use of the apparatus of this invention the term "welding" will be used to include welding, cutting and heating operations.

In conventional fusion welding practice it is necessary to move the welding heat source or workpiece, which can lead to having to solve the conflicting requirements of having to move large masses at relatively high speeds along accurately defined paths. The solution of these requirements leads to the need for expensive apparatus.

The present invention aims at providing welding apparatus in which both the source and workpiece are stationary, guidance of the welding power along the desired path being effected by mobile members of a cheap lightweight construction.

Accordingly the present invention provides apparatus for welding (as defined above) which, in its broadest aspect, is as defined in claim 1 of the appended claims.

The present invention will now be described by way of example with reference to the accompanying drawing, in which:

FIG. 1 is a diagrammatic view, part in section and part in elevation, of apparatus for using a beam of radiant energy to weld along circular paths, and FIG. 2 is a diagrammatic representation of part of the apparatus shown in FIG. 1 modified for welding along noncircular paths.

The apparatus shown in FIG. 1 comprises a continuous wave $CO_2$ laser 2 aligned with an aperture 4 in a rotary support plate 6 adapted to be driven by a pinion 8 engaging the outer rim of the plate and driven by an electric motor 10. The axis of rotation of plate 6 coincides with the optical axis of the laser 2. Mounted on a rigid arm 12 extending from the plate 6 is a rotary plane front-surface-coated mirror 14 positioned to intersect the coherent radiation passing through the aperture 4 and reflect it to a second similar surface-coated mirror 16 also carried by plate 6 by means of an arm 18. The radiation reflected from mirror 16 is brought to a focus by means of a lens 20 supported from arm 18 on the upper surface of a workpiece 22 supported on blocks 24 which hold the component parts of the workpiece together before and during welding.

It will be seen that with this arrangement the radiation from the laser 2 is able to weld the workpiece 22 along a circular or part-circular path of which the radius is determined by the radial distance between the axis of rotation of plate 6 and the effective center of mirror 16.

In order to weld along circular paths of different diameters the arm 18 can be adjustably secured to the plate 6 in a manner permitting it to move along the radial path along which coherent radiation is reflected from mirror 14.

The speed of rotation of the support 6, and therefore the speed with which the welding path is traced out on the workpiece 22 by the point of incidence of the beam 26 of coherent radiation, is so related to the power of the beam and to the characteristics of the workpiece and desired weld that a sound weld is produced along the entire length of the desired welding path.

That form of the invention shown in FIG. 2 is to enable noncircular paths to be traced out and welded. With the apparatus shown in FIG. 2 the mirror 16 is able to be moved towards and away from the first mirror 14 independently of angular movement thereof so that any desired circular or noncircular path, or part thereof, can be traced out and welded.

In FIG. 2, those parts which function similarly to those described and shown in FIG. 1 are given the same references.

In the FIG. 2 apparatus the support plate 6 is stationary and carries a roller or ball bearing 30 to which the first mirror 14 is connected by an arm 12 so as to permit mirror 14 to rotate relatively to support 6. However, unlike FIG. 1, the second mirror 16 is connected not directly to support 6 but to the frame of an electric motor 32 having its output shaft 34 connected to a platform 36 on which is mounted a second electric motor 38 arranged to drive a traction wheel 40 held in friction engagement (by means which are not shown) with the undersurface of the support 6.

Extending from the mounting of mirror 14 is a rod 42 which lies outside the optical path between the two mirrors, but which is connected to the mirror 16 in a way which permits the mirror 16 to be adjustably positioned along the length of rod 42, but which ensures that the radiation reflected from mirror 14 always falls on mirror 16. Preferably also the mirror 16 is mounted so that the radiation reflected from it to the workpiece lies in the same plane as that which contains the path of the radiation to and from the mirror 14. Normally the mirror 16 is mounted so that the radiation reflected from it is incident vertically on the workpiece, but it is conceivable that mirror 16 be adjustably mounted so that the radiation can be incident on the workpiece at an oblique angle.

In operation the motor 38 is adapted to be driven at a constant speed which is related to the other variable factors involved in the welding operation to ensure that the beam 26 traverses the workpiece at the right speed to bring about a good weld.

In contradistinction, the motor 32 is driven at a chosen speed, which may be zero, and in effect it acts as a steering motor. By adjusting this speed appropriately to that of the driving motor 38 the radiation reflected from mirror 16 can be made to trace out a circular path of any desired radius, or any noncircular path. The traction wheel 40 is positioned above the effective center of the mirror 16, i.e. the point from which most of the incident radiation from mirror 14 is reflected, and in line with the axis of the shaft 34 of motor 32 to ensure that the speed of travel of the mirror, and hence of the beam 26 over the workpiece, when the beam is perpendicular to the surface thereof, is equal to the speed of travel of the wheel 40 over the surface of support 6, and that the path traced out on the workpiece is accurately related to the path of traction wheel 40.

While the driving motor 38 is preferably energized from a source of constant strength in order to drive the motor at a desired constant speed, the steering motor 32 has to be energized selectively. This can be done by any known means which do not in themselves form part of the present invention. For example, the steering motor 32 could be controlled by an associated numerically controlled unit in which data corresponding to the desired welding path are stored on magnetic or paper tape. Alternatively the motor 32 could be controlled by an associated line follower following a pattern of the path to be traced, as is well known in flame-cutting machines. Preferably such a line follower has a similar arrangement of coordinate motors so that the signals produced by these motors are able to be used for controlling the movable mirror without conversion.

The beam of energy may weld or otherwise treat the workpiece unassisted, or it may be used in conjunction with other apparatus for beneficially modifying the reaction which the beam would otherwise have with the workpiece.

Accordingly it will be seen that the present invention provides a lightweight construction in which only few components need to be moved to dictate the path traced out from the workpiece by the beam of welding radiation.

We claim:

1. Apparatus for selectively heating a stationary workpiece, including a stationary source of radiant energy; means for directing said energy in a beam at a rotary first mirror along the axis of rotation thereof, means rotatably mounting said first mirror on a fixed support; a second mirror mounted on a fixed support and including means for moving said second mirror in a two-dimensional area and including electrical control means, said second mirror positioned by said electrical control means to intercept the beam of radiation reflected from said first mirror and to reflect said beam toward said stationary workpiece, means connecting said first mirror to said second mirror and positioned to reflect said beam from said first mirror to said second mirror at all relative positions of each of said mirrors, and means moving said first and second mirrors to direct said beam along a preselected path to be heated on said workpiece.

2. The apparatus defined in claim 1, in which the movement of said second mirror is controlled by first and second coordinate electric motors.

3. The apparatus defined by claim 2, in which said first motor includes a drive wheel in frictional engagement with a planar surface on said fixed support, said motor responsive to rotate said wheel at a preselected speed corresponding to the desired path along which the workpiece is to be heated, said second motor including means to vary the relationship of the drive wheel and said planar surface in accordance with a preselected path.